July 14, 1942.　　W. T. STICK ET AL　　2,289,889
GARDEN SPRINKLER
Filed Feb. 28, 1940
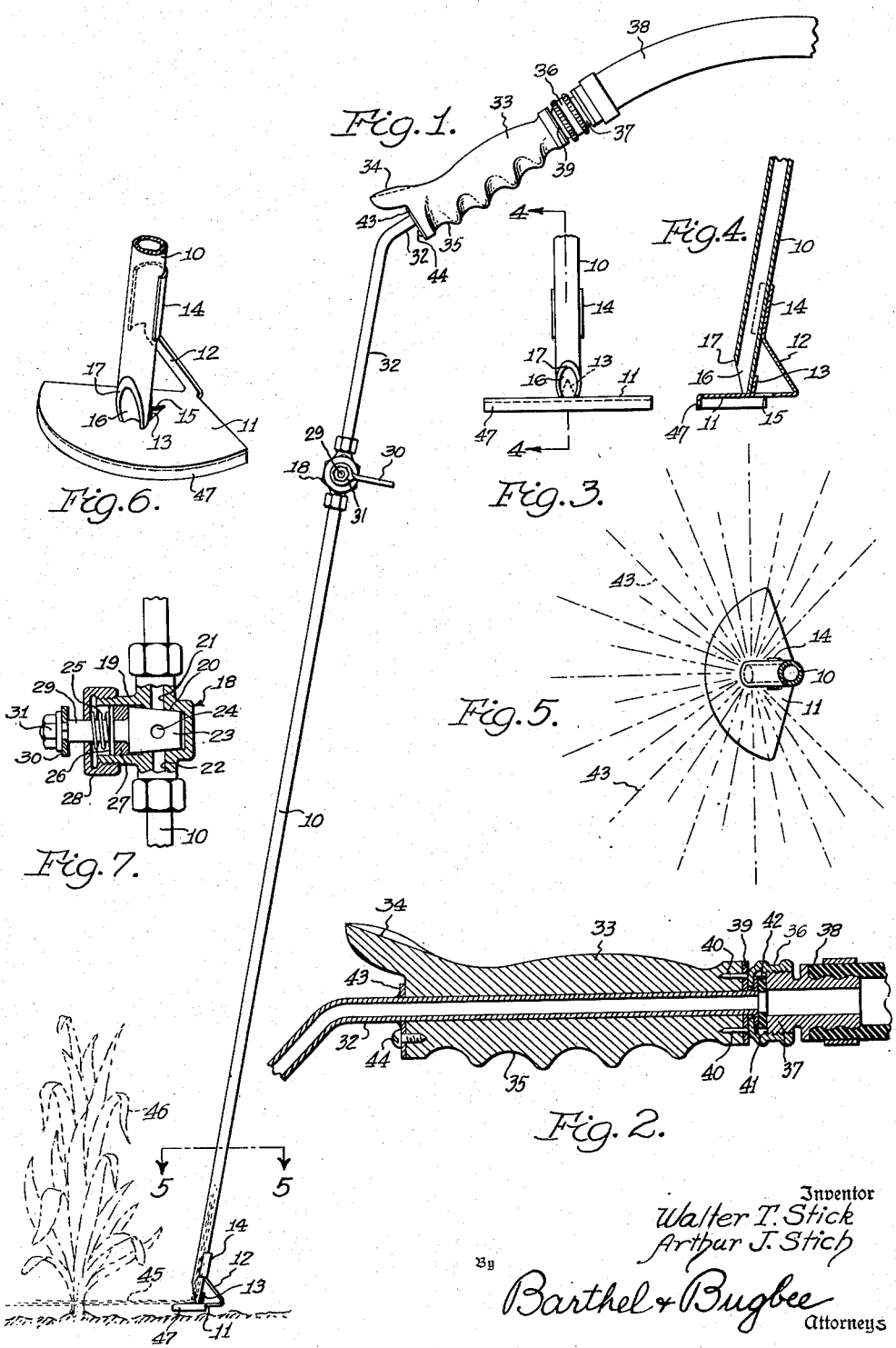
Inventor
Walter T. Stick
Arthur J. Stich
By Barthel & Bugbee
Attorneys Patented July 14, 1942

2,289,889

UNITED STATES PATENT OFFICE 2,289,889

GARDEN SPRINKLER

Walter T. Stick and Arthur J. Stich,
Detroit, Mich.

Application February 28, 1940, Serial No. 321,230

2 Claims. (Cl. 299—111)

This invention relates to sprinklers and in particular to garden sprinklers which are held in the hand and manipulated by the user.

One object of this invention is to provide a garden sprinkler which enables the watering of the roots and the lower portions of the plants without watering the foliage or upper portions thereof.

Another object is to provide a garden sprinkler which may be held in the hand of the user but which projects a fan-shaped jet of liquid in such a direction as to be incapable of wetting the user.

Another object is to provide a garden sprinkler having means for projecting a sheet of liquid substantially horizontal, this being capable of being held in the hand of the user and directed by him to the roots or lower portions of plants without requiring him to stoop or bend over.

Another object is to provide a garden sprinkler having an elongated support with means thereon for projecting a diverging jet of liquid, means being provided to control the force and direction of this jet according to the will of the user.

Another object is to provide a garden sprinkler consisting of a tubular conduit having a hose connection at one end and means for providing a fan-shaped jet of liquid near the other end, this jet being controllable as to direction and size by devices incorporated therein.

Another object is to provide a garden sprinkler consisting of an elongated conduit forming a support and having a hose connected at one end and an aperture and baffle member at the other end so constructed and arranged as to produce a substantially horizontal fan-shaped jet of liquid when the support is held in an approximately vertical position, this baffle member being effective to break the force of the jet and prevent injury to plants or seeds.

Another object is to provide a garden sprinkler having a conduit with a nozzle portion at one end thereof and a transversely disposed baffle to convert the jet of liquid from the nozzle portion into a fan-shaped sheet of liquid which spreads out horizontally in a forward and lateral direction only, thereby preventing the wetting of the feet or clothing of the user.

Another object is to provide a garden sprinkler which enables the watering of roots and lower portions of the plants, without watering the foliage or upper portions including blooms: by eliminating the practice of watering the entire plants (both foliage and blooms) we avoid the damage caused by mildew and "burn" which results from the use of water containing injurious substances, such as chlorine, etc.

In the drawing:

Fig. 1 is a side elevational view of a preferred form of the invention;

Fig. 2 is a longitudinal section through the handle of the garden sprinkler shown in Fig. 1;

Fig. 3 is an enlarged front elevation of the lower portion of Fig. 1;

Fig. 4 is a section taken along the line 4—4 in Fig. 3;

Fig. 5 is a diagrammatic horizontal section taken along the line 5—5 in Fig. 1;

Fig. 6 is a perspective view of the lower portion of the garden sprinkler shown in Figs. 1 to 5, inclusive; and Fig. 7 is an enlarged view of the control valve for the sprinkler, partly in section.

In general, the garden sprinkler of this invention consists of an elongated conduit having a handle and a hose connection at its upper end and an outlet at its lower end. A valve in the conduit enables the force and quantity of the liquid to be manually controlled. The lower portion of the device includes a baffle member extending transversely across the conduit adjacent the outlet thereof. This baffle member serves to break the force of the liquid and at the same time to convert the jet thereof into a fan-shaped sheet which may be directed at the roots or lower portions of plants without wetting the feet or clothing of the user.

Referring to the drawing in detail, Fig. 1 shows a preferred form of the garden sprinkler of this invention as consisting of an elongated conduit 10 serving as a support for the baffle member 11 mounted on the lower end thereof and secured thereto by the arms 12 and 13. The arm 12 is integral with the baffle member 11 and is provided with a semi-cylindrical portion 14 by which it may be secured, as by soldering, brazing or welding, to the conduit 10.

The arm 13 is struck-up out of the baffle member 11, leaving an aperture 15. The arm 13 is likewise secured to the lower end of the conduit 10, in a manner similar to the securing of the portion 14. The baffle member 11 is substantially fan-shaped and is disposed at an angle slightly greater than a right angle relatively to the axis of the conduit 10.

The lower end of the conduit 10 adjacent the baffle member 11 is provided with an outlet 16 formed by cutting away the end of the conduit 10 at an angle, as at 17. The liquid thus emerges from the outlet 16 immediately adjacent the baffle member 11 and is thereby converted into a fan-shaped sheet of liquid.

The conduit 10 contains a control valve 18 by which the force and quantity of the liquid may be manually controlled. This valve 18 (Fig. 7) consists of a casing 19 having a frusto-conical bore 20 and transverse ports 21 and 22 leading into and away from the bore 20. Rotatably mounted in the bore 20 is a frusto-conical valve member 23 in the form of a plug and having a transverse passageway 24 alignable with the passageways 21 and 22 when the valve member 23 is rotated.

The valve member 23 is urged into the valve bore 20 by a coil spring 25 engaging a washer 26 and packing 27, the whole being held in place by a threaded cap 28.

Connected to the valve member 23 is a valve stem 29 to which the valve handle 30 is secured, as by the nut 31 threaded thereon.

Extending upwardly from the valve 18 is a conduit 32 upon which is mounted the handle 33 (Fig. 2). The handle 33 is provided with a thumb rest 34 and finger notches 35. Mounted upon the outer end of the conduit 32 is a threaded hose connection 36 for attachment to the threaded end member 37 of a hose 38. A disc 39, secured as at 40, to the handle 33, prevents wear of the latter and likewise serves to retain the threaded hose connection 36 in position against the flange 41 on the end of the conduit 32. A washer 42 prevents leakage at the hose connection 36. A disc 43, welded or soldered to the conduit 32 and secured as at 44 to the handle 33, assists in holding the latter in place.

In the operation of the invention, the user attaches the hose 38 to the conduit 32 by means of the hose connection 36 and turns on the liquid. The liquid emerges from the outlet 16 in a jet, the force of which and quantity of which may be regulated by adjusting the valve handle 30. The jet of liquid emerging from the outlet 16 impinges upon the baffle member 11 and is spread out into a fan-shaped sheet 45 (Fig. 1). Due to the fact that the outlet 16 is cut away obliquely to the axis of the conduit 10 (Fig. 4) and also to the fact that the baffle 11 is mounted at slightly greater than perpendicular to this axis, the fan-shaped sheet of liquid extends only in a forward and lateral direction (Fig. 5) and leaves a rearward zone which is entirely free from liquid. This feature enables the user to use the device without wetting his feet or clothing.

As the conduit 10 is held in an approximately vertical position, the fan-shaped sheet or jet of liquid 45 is directed substantially horizontally and approximately parallel to the ground. In this manner the force of the liquid emerging from the outlet 16 is broken and at the same time the fan-shaped sheet 45 projected against the lower portions and roots of the plants 46 without wetting the foliage or upper portions thereof.

If the operator so desires, he can rest the baffle 11 upon the ground and use it as a base for assisting him to control the sprinkling operation. By using the device in the manner of a wand, the user can go from plant to plant, watering the roots of each with an economy of liquid and without wetting his feet or clothing.

Since the entire device is light in weight, it is easily manipulated and the jet or sheet of liquid accurately directed to any point which it is desired to sprinkle. Due to the fact that the force of the jet is broken by the baffle member 11, the jet does not dig a hole in the ground and, hence, will not injure seeds which have just been sown in loose soil. The flat baffle member 11 also assists in preventing the device from sinking into such soil if the user rests it on the ground, while a flange 47 thereon prevents its edge from cutting the plants and also strengthens it.

While a specific embodiment of the invention has been described and illustrated, it will be understood that various modifications may be made within the scope of the appended claims without departing from the spirit of the invention.

What we claim is:

1. In a garden sprinkler, an elongated conduit extending approximately from the ground level to the hands of the operator when standing upright, a hose connection at the upper end of said conduit, a nozzle at the lower end of said conduit, a baffle plate spaced away from and below the outlet of said nozzle and arranged nearly perpendicularly thereto, and a baffle supporting structure extending between said baffle and said nozzle whereby said baffle serves not only to deflect the liquid but also to support the sprinkler upon the ground and to push aside plants in using the sprinkler.

2. In a garden sprinkler, an elongated conduit extending approximately from the ground level to the hands of the operator when standing upright, a hose connection at the upper end of said conduit, a nozzle at the lower end of said conduit, a baffle plate spaced away from and below the outlet of said nozzle and arranged nearly perpendicularly thereto, and a baffle supporting structure extending between said baffle and said nozzle whereby said baffle serves not only to deflect the liquid but also to support the sprinkler upon the ground and to push aside plants in using the sprinkler, the outlet of said nozzle being cut away at an angle to said baffle and to the axis of said nozzle.

WALTER T. STICK.
ARTHUR J. STICH.